Aug. 6, 1968
C. W. KERNS
3,396,365
METHOD OF PROCESSING GEOPHYSICAL DATA
WITH STABLE INVERSE FILTERS
Filed May 3, 1966
2 Sheets-Sheet 1
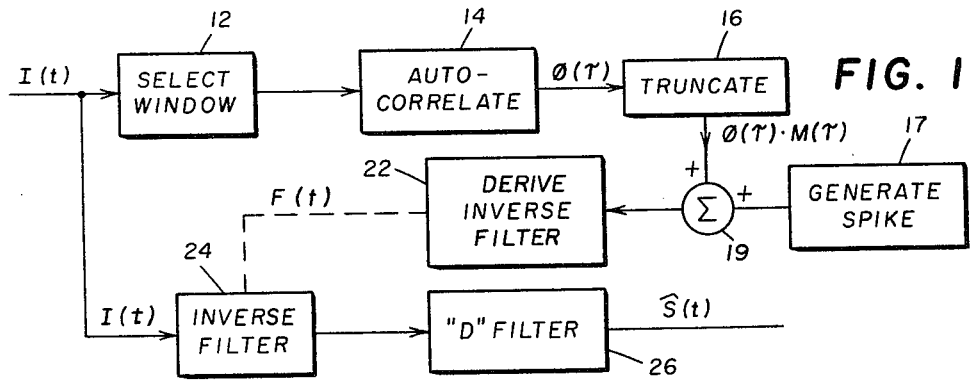
FIG. 1
FIG. 2
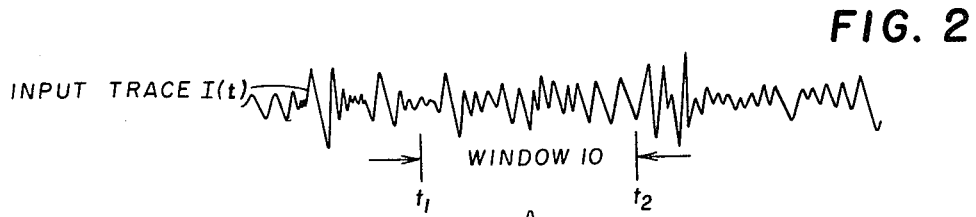

FIG. 3C

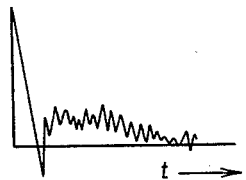
FIG. 6
INVERSE FILTER F(t)
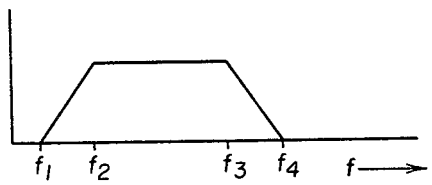
FIG. 7
AMPLITUDE SPECTRUM OF "D" FILTER
$f_1$  $f_2$  $f_3$  $f_4$  $f \longrightarrow$
FIG. 8
WHITE NOISE
$t \longrightarrow$
FIG. 9
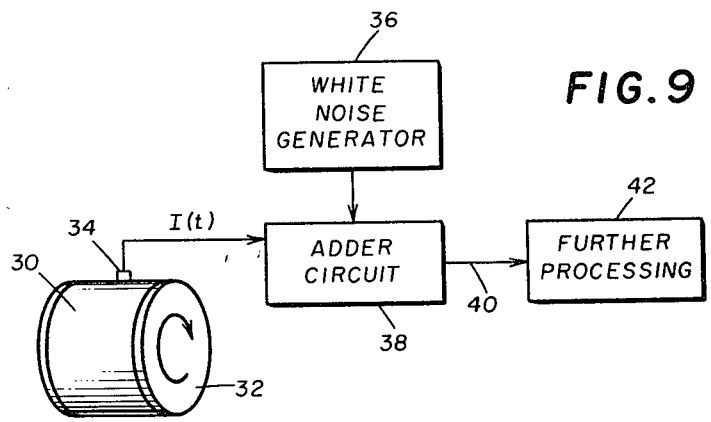

United States Patent Office 3,396,365
Patented Aug. 6, 1968

3,396,365
METHOD OF PROCESSING GEOPHYSICAL DATA WITH STABLE INVERSE FILTERS
Clyde W. Kerns, Irving, Tex., assignor to Mobil Oil Corporation, a corporation of New York
Filed May 3, 1966, Ser. No. 547,344
9 Claims. (Cl. 340—15.5)

ABSTRACT OF THE DISCLOSURE

The specification discloses a method of processing seismic data to suppress coherent noise such as multiples, reverberations, and ghosts. An autocorrelation function is produced from an input seismic signal to characterize the noise. A white noise spike is added to the center point of the autocorrelation function to assure the stability of an inverse filter which is generated from the autocorrelation function. The input seismic signal is then convolved with the inverse filter.

---

This invention relates to the processing of geophysical data to render it more useful in interpreting the geophysical characteristics of the earth in the exploration for oil and gas deposits. Specifically, the invention relates to a method of stabilizing the process of deriving an inverse filter employed in the processing of the geophysical data to attenuate any undesirable components in the data. While the invention will be described with reference to the processing of seismic data, it is equally applicable to other types of geophysical data, such as well logs, gravity information, and magnetic data.

In seismic exploration, data is obtained by first creating an artificial disturbance along the earth by use of dynamite or the like. The resulting acoustic waves travel downwardly in the earth and are reflected upward from subsurface reflecting interfaces. The reflected waves are received at detectors or geophones located along the ground and recorded in a reproducible form. Ideally, the waves recorded at the geophones would be exactly representative of the reflecting characteristics (referred to as the reflectivity function) of the earth without any undesirable components, such as noise or distortion.

Unfortunately, the signals recorded at the geophones contain many undesirable components which often obscure the reflectivity function of the earth and prevent the finding of an area of the earth where oil and gas deposits may be present. One undesirable component of the recorded seismic data is due to the seismic disturbance created by the explosion of dynamite and known as the shot pulse. Ideally, the time waveform of the shot pulse should be a simple known pulse, such as an impulse or a square wave. Instead, the shot pulse resulting from the explosion of dynamite, or almost any other known seismic source, is a complex train of wavelets. As a result, the reflectivity function of the earth is obscured by the complex waveforms of the reflected shot pulse appearing on the recorded data. To make matters worse, the shot pulse changes in amplitude and shape with depth in the earth so that the recorded data contains reflections of a time-varying shot pulse.

The prior art has attempted to remove the obscurity in the recorded data due to the shot pulse by a process of inverse filtering designed to collapse it to a simpler waveform, such as an impulse. To derive the inverse filter for application to the seismogram, an estimation function of the shot pulse must be obtained by prior experience or by sampling the shot pulse with a detector close to the detonation of the shot pulse (the uphole detector).

Other undesirable components in the seismogram include the effect of multiple reflections, ghosts, reverberations, and other types of distortion known in the seismic art. All these types of distortion may be referred to collectively as the distortion operator. It is desirable to remove the effects of the distortion operator on the seismogram, but the difficulty is that the waveform of the distortion operator is unknown. Furthermore, the effect of the distortion operator is intermixed in a complex way with the shot pulse. Therefore, the distortion operator and the shot pulse may be lumped together as a single component and called the distorted shot pulse. In a copending application Ser. No. 410,526, filed Nov. 12, 1964, entitled "Processing of Geophysical Data," filed for Manus R. Foster, Raymond L. Sengbush, and myself, there is disclosed a technique for characterizing the distorted shot pulse in geophysical data without knowledge of its waveform. Once the distorted shot pulse has been characterized, an inverse filter may be derived which can be applied to the seismic data to suppress the distorted shot pulse, leaving primarily the reflectivity function.

Sometimes when a function is derived which characterizes an undesired component of a seismogram, such as by either of the above methods, the function has an unstable exact inverse. When a function has an unstable exact inverse, an exact inverse filter may not be derived for application to the seismogram to remove the undesired component. An exact inverse filter is one which will convert the undesired component exactly into a spike function of unit magnitude. When an unstable function is inverted to produce an exact inverse filter the process sometimes "blows up" as is well known in the seismic art. When these exact inverse filters "blow up," the response function of the filters increases without limit with increasing time. Such exact inverse filters are technically called unstable. An unstable exact inverse filter is defined as a filter whose amplitude-frequency spectrum becomes infinite at some frequency.

Obviously seismic data may not be filtered to remove exactly the effects of an undesired component if the exact inverse of the component is unstable. Even where mathematical methods, such as the well-known Least Squares Method, are used to minimize the error between an approximate inverse filter and the exact inverse filter, the resulting inverse filter is not of a desirable type. The reason that the approximate inverse filter is undesirable is that its coefficients are nonminimum phase. Since most seismic inverse filtering operations require a minimum phase inverse filter, even these methods of deriving approximate inverse filters are not sufficient.

Therefore, in accordance with a broad aspect of my invention the stability of the process of deriving a desired inverse filter is assured by introducing white noise into the process. With white noise introduced into the process, there is no need to test each characterizing function for stability before deriving a desired inverse filter from the function. Regardless of the stability or instability of the exact inverse of any function characterizing an undesired component of seismic data, the stability of the process of deriving a desired inverse filter is guaranteed with white noise added to the process.

In accordance with another aspect of my invention, a function which characterizes an undesired component of geophysical data, but having an unstable exact inverse, may be used to derive a desired inverse filter for application to the geophysical data. The stability of the derivation of the inverse filter is effected by introducing white noise into the process of deriving the characterizing function. By "white noise," I mean random noise whose power density spectrum is flat over a band of frequencies which is wider than the band of the system, process, or function into which it is introduced. For example, the flat band of the white noise is wider than the function characterizing the undesired component. With white noise added to the characterizing function, a desired inverse filter may be derived. The desired inverse filter may then be applied to the geophysical data to produce an output with the undesired component attenuated.

For a better understanding of the invention, refer now to the following detailed description and accompanying drawings in which:

FIGURE 1 is a flow diagram of the use of the invention to stabilize the derivation of an inverse filter derived from a characterizing function which has been obtained from an input seismic trace;

FIGURE 2 illustrates the input seismic trace to the process of FIGURE 1;

FIGURES 3A–3C illustrate waveforms used in describing the process illustrated in FIGURE 1;

FIGURE 6 illustrates a graph of the desired inverse filter used for filtering the geophysical data;

FIGURE 7 illustrates the amplitude spectrum of the "D" filter used in the process of FIGURE 1;

FIGURE 8 illustrates a typical time waveform of white noise; and

FIGURE 9 illustrates an alternate embodiment for introducing white noise into seismic data.

Figure 3A:

One geophysical data processing technique to which the present invention is applicable is the one described in the aforementioned application Ser. No. 410,526. In said application, there is described a process for deriving a characterizing function for the distorted shot pulse in seismic data from the data itself without knowledge of the exact waveform of the distorted shot pulse. The present invention will be described with reference to the processing of seismic data as described in the aforementioned application.

FIGURE 1 illustrates a flow diagram of the time-domain processing steps for attenuation of the distorted shot pulse from seismic data in accordance with the present invention. Preferably the processing steps are performed on a general-purpose digital computer, such as the Control Data Corporation Model 3600 Computer. By following the flow diagram of FIGURE 1 and the teachings of this specification, those skilled in the art may program such a general-purpose digital computer to carry out the present invention.

Briefly, a preferred embodiment of the present invention provides a method of processing geophysical data to attenuate any undesired component of the data, such as the distorted shot pulse. The processing steps include:

(1) A sample portion or window of a seismic signal $I(t)$ is selected at 12 over a time segment.

(2) The window is autocorrelated at 14 and the resulting autocorrelation function $\phi(\tau)$ is truncated at 16 with a rectangular truncator to produce a truncated autocorrelation function $\phi(\tau)$. $M(\tau)$ that characterizes the distorted shot pulse in the seismic trace $I(t)$.

(3) To stabilize the derivation of an inverse filter from the truncated autocorrelation function $\phi(\tau) \cdot M(\tau)$, white noise is introduced into the function $\phi(\tau) \cdot M(\tau)$ by generating a spike function at 17 and adding the spike function to the center point of the truncated autocorrelation function in step 19. Preferably the spike function has an amplitude between 0.1 percent and 10 percent of the peak amplitude of the truncated autocorrelation function.

(4) An inverse filter is derived at 22 from the truncated autocorrelation function.

(5) The input trace $I(t)$ is convolved at 24 with the inverse filter derived from step 22. The output of the inverse filtering operation at 24 represents the reflectivity function of the input trace $I(t)$.

(6) The inverse-filtered seismic trace is convolved at 26 with a "D" filter to produce an output $\hat{S}(t)$ containing only the reflectivity function convolved with the desired shot pulse inserted by the "D" filter.

Each of the foregoing processing steps will now be described in more detail in the following.

*Derivation of the characterizing function*

Before going into the details of processing seismic data to characterize the distortion, it is convenient to set up the following mathematical model for a seismic trace generated by a shot pulse:

$$I(t) = B(t) * H(t) * R(t) + N(t) + U(t) \qquad (1)$$

where $I(t) =$ input seismic trace,
$B(t) =$ shot pulse,
$H(t) =$ all types of distortion referred to collectively as the distortion operator,
$R(t) =$ the reflectivity function of the earth,
$N(t) =$ coherent noise, and
$U(t) =$ incoherent or random noise.

Equation 1 breaks down the components of a seismic trace $I(t)$ generated by a shot pulse $B(t)$ into the shot pulse $B(t)$, convolved with the distortion operator $H(t)$, convolved with the reflectivity function $R(t)$, plus coherent noise $N(t)$ and random noise $U(t)$. The asterisk denotes convolution, the mathematical operation known in the art. The seismic trace $I(t)$ is the result of the shot pulse $B(t)$ being filtered by the reflectivity of the earth and by the distortion operator $H(t)$. For general background on the process of filtering which can be expressed by the mathematical operation of convolution, refer to Chapter II of "Statistical Theory of Communication," by Y. W. Lee, John Wylie and Sons, Inc., New York, 1961.

The distortion operator $H(t)$ may have various waveforms, depending on the causes of the distortion. The distortion may be due to the well-known effects of multiple reflections, ghosts, reverberations, or any other kind, such as instumental distortion. Usually the distortion operator $H(t)$ is unknown except for very simple cases not encountered in ordinary field data. Therefore, a function must be derived which characterizes the distortion operator $H(t)$ from the trace $I(t)$ itself.

A further complicating factor in processing seismic data to render it more useful in the interpretation of the reflectivity function $R(t)$ is that the shot pulse $B(t)$ is a complicated wave form of unknown characteristics. Therefore, the shot pulse $B(t)$ and the distortion operator $H(t)$ may be lumped together and expressed by the following equation:

$$C(t) = B(t) * H(t) \qquad (2)$$

where $C(t)$ is defined as the distorted shot pulse.

By processing an input seismic trace $I(t)$ by the steps to be described below, the distorted shot pulse $C(t)$ is replaced with a desired shot pulse $D(t)$ which has special desirable properties, such as a flat spectrum over a broad band. The insertion of the desired shot pulse $D(t)$ will leave a desired signal $\hat{S}(t)$ from which it will be much easier to interpret the geological characteristics of the earth (the reflectivity function $R(t)$). Mathematically, the desired signal $\hat{S}(t)$ can be expressed as:

$$\hat{S}(t) = D(t) * R(t) \qquad (3)$$

The processing of an input seismic trace $I(t)$ to characterize the distorted shot pulse $C(t)$ in the time domain will be described with reference to the flow diagram of FIGURE 1. The processing steps will be described in such detail as to permit one of ordinary skill in the art to carry out the invention by programming a general-purpose digital computer. It will be understood that any of the processing steps illustrated by the blocks of FIGURE 1 may be substituted by analog equipment well known in the art, such as, for example, that disclosed in "Electronic Analog Computers" by Korn and Korn, McGraw-Hill, 1946, Second Edition.

SELECT A WINDOW. Referring to FIGURES 1 and 2, a portion, referred to as a window 10, of an input seismic trace I(t) is selected at 12 over a time segment from $t_1$ to $t_2$. The input trace I(t) will generally be recorded in digital form on a magnetic tape and be reproduced by a magnetic sensing head located on a tape-reading unit for input to the digital computer. Along with the trace I(t) there is generally recorded on the magnetic tape timing signals which may be used to select the window. The window 10 is selected during a time interval from $t_1$ to $t_2$ where the removal of the distorted shot pulse C(t) is desired to be most effective. The window 10 will receive the best inverse filtering of the distorted shot pulse. The remaining portions of the trace I(t) will have the distorted shot pulse removed but to a lesser degree than that of window 10.

AUTOCORRELATE. Next, the window 10 is autocorrelated at 14 to produce as an output an autocorrelation function $\phi(\tau)$ illustrated by the curve of FIGURE 3A. The autocorrelation function $\phi(\tau)$ can be expressed by the follwing equation:

$$\phi(\tau) = \phi_C * \phi_R + \phi_N + \phi_U \tag{4}$$

where $\phi_C$ = the autocorrelation of the distorted shot pulse C(t),
$\phi_R$ = the autocorrelation of the reflectivity function R(t) component in window 10,
$\phi_N$ = the autocorrelation of the coherent noise N(t) component in window 10, and
$\phi_U$ = the autocorrelation of the random noise U(t) component in window 10.

Since it can be assumed that the reflectivity R(t), the coherent noise N(t), and the random noise U(t) are uncorrelated, the cross-correlation terms in Equation 4 are zero. The components $\phi_R$ and $\phi_U$ are estimates of the true autocorrelation function of the components R(t) and U(t) if the entire seismic trace I(t) had been autocorrelated. If the coherent noise is low, $\phi_N$ is approximately zero and Equation 4 becomes:

$$\phi(\tau) = \phi_C * \phi_R + \phi_U \tag{5}$$

Figure 3B:
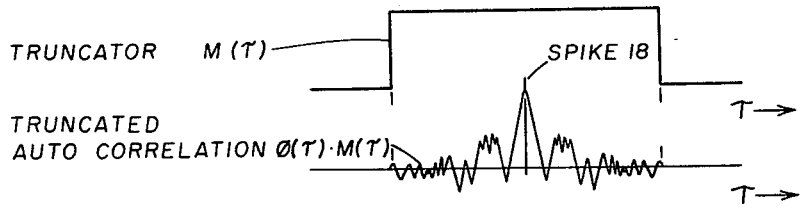

TRUNCATE. The next step is to select the portion of the autocorrelation function $\phi(\tau)$ most characterizing the autocorrelation component $\phi_C$ of the distorted shot pulse C(t). The selection is achieved by multiplying at 16 the autocorrelation function $\phi(\tau)$ by the rectangular truncator $M(\tau)$ (illustrated in FIGURE 3B) to produce a truncated autocorrelation function $\phi(\tau) \cdot M(\tau)$. It will be apparent that it is not necessary to generate the entire autocorrelation function of window 10 and then to rectangularly truncate the function. Instead, in a preferred embodiment of the invention, the autocorrelation of window 10 is stopped at a relative time shift during the correlation process corresponding with the ends of the rectangular truncator $M(\tau)$.

The truncated autocorrelation function $\phi(\tau) \cdot M(\tau)$ appearing at the output of the truncating step 16 is a good estimate of $\phi_C$, the autocorrelation of the distorted shot pulse. The function $\phi(\tau) \cdot M(\tau)$ provides a good estimate of the amplitude spectrum of the distorted shot pulse C(t), but the phase spectrum of C(t) is lost. However, it is known that the distorted shot pulse C(t) is a minimum phase function so that its phase spectrum is uniquely defined by its amplitude spectrum. Therefore, the truncated autocorrelation function $\phi(\tau) \cdot M(\tau)$ uniquely characterizes the distorted shot pulse C(t).

*Instability of inverse of the characterizing function*

Now that the truncated autocorrelation function $\phi(\tau) \cdot M(\tau)$ characterizes the distorted shot pulse C(t), it is desirable to derive an inverse filter from $\phi(\tau) \cdot M(\tau)$ for application to the seismic trace I(t) to remove the effect of the distorted shot pulse C(t). However, the truncated autocorrelation function of FIGURE 3C may have an unstable exact inverse. As previously defined, an unstable exact inverse is one whose amplitude-frequency spectrum becomes infinite at some frequency.

Even where the Least Squares Method is used to derive a stable approximation to the unstable exact inverse, the resulting inverse is undesirable. It is undesirable because it does not have a minimum phase characteristic. A minimum phase inverse is defined as the inverse whose phase characteristic is a minimum with respect to the phase characteristics of all other inverses having the same amplitude spectrum. Physically speaking, a minimum amplitude spectrum. Physically speaking, a minimum phase inverse will be that member of the class of all inverse functions having the same amplitude spectrum, which tends to have its "center of gravity" closest to the time origin. In complex variable theory, a function which has a Z-transform with no roots on or within a unit circle is called minimum phase. A function whose Z-transform has at least one root inside the unit circle is called non-minimum phase. For still further discussion of the phenomenon of instability, refer to an article entitled "The Stability of Digital Filters," IEEE Transactions on Geoscience, November 1964, pp. 6–18.

The quality of having an unstable exact inverse in the characterizing function may be due to its inherent nature, particularly if it is an estimation function designed to collapse a shot pulse into an impulse. Also, the characterizing function may have an unstable exact inverse because of some operation performed during the process to derive it. For example, when the rectangular truncator $M(\tau)$ is applied to the autocorrelation function $\phi(\tau)$, instability in the inverse may be introduced since the rectangular truncator $M(\tau)$ has negative spectral components in the frequency domain. Whether truncating $\phi(\tau)$ with $M(\tau)$ results in having an unstable exact inverse depends upon the particular spectral characteristics of $\phi(\tau)$. Experience has demonstrated that certain truncated autocorrelation functions have unstable exact inverses, while others do not. Even though the rectangular truncator $M(\tau)$ may introduce the quality of having an unstable exact inverse, this truncator nevertheless may be the one most desirable for separating the distorted shot pulse components from the autocorelation function $\phi(\tau)$.

*Producing stability in the derivation of the inverse filter*

Figure 5:
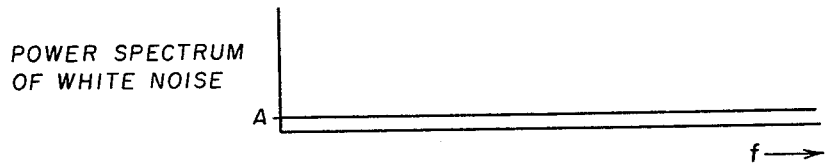
FIGURE 5 illustrates the power density spectrum of the white noise added in the process of FIGURE 1.

ADD WHITE NOISE. In accordance with the present invention, white noise is introduced into the characterizing function before derivation of the inverse filter to stabilize the derivation of a desired inverse filter. White noise, whose typical time waveform is illustrated in FIGURE 8, is defined as random noise whose power density spectrum is flat over a band of frequencies which is wider than the band of the system, process, or function into which it is introduced. The flat power spectrum of white noise is illustrated in FIGURE 5. One form of white noise is defined as random noise having an autocorrelation function which is equal to a spike function.

Since the characterizing function in the described embodiment is a truncated autocorrelation, white noise may be introduced by generating at 17 a spike function 18 and adding it at zero time (the center point) to the truncated autocorrelation function $\phi(\tau) \cdot M(\tau)$ of FIGURE 3C. Experience has demonstrated that the spike function 18 should have an amplitude which is small compared to the peak amplitude of the truncated autocorrelation function $\phi(\tau) \cdot M(\tau)$. Preferably, the spike function 18 has an amplitude between about .01 percent and 10 percent of the peak amplitude of the function $\phi(\tau) \cdot M(\tau)$. In one satisfactory embodiment, the spike 18 had an amplitude of 1 percent of the peak of $\phi(\tau) \cdot M(\tau)$.

Figure 4:
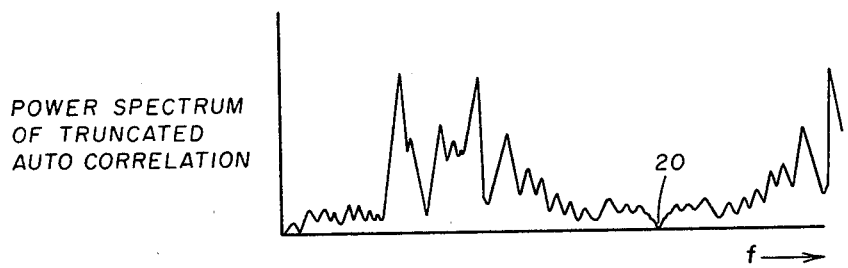
FIGURE 4 illustrates a graph of the power density spectrum of the truncated autocorrelation function derived in the process of FIGURE 1.

A typical power density spectrum of the truncated autocorrelation function $\phi(\tau) \cdot M(\tau)$ is illustrated in FIGURE 4. If the function $\phi(\tau) \cdot M(\tau)$ is represented by sample data stored in a digital computer, the power spectrum of FIGURE 4 will have a notch 20 at the Nyquist folding frequency. The Nyquist folding frequency is equal to $1/T$, where T is the sampling interval of the function $\phi(\tau) \cdot M(\tau)$. Beyond the Nyquist folding frequency 20, the power spectrum of the truncated autocorrelation function repeats itself. In practicing the present invention, white noise introduced into the characterizing function should have a flat power density spectrum at least as broad as the Nyquist folding frequency 20.

The adding of white noise to the characterizing function $\phi(\tau) \cdot M(\tau)$ places a noise component at the Nyquist folding frequency 20 and at any other frequencies at which the power spectrum of $\phi(\tau) \cdot M(\tau)$ is zero. One plausible explanation for the successful operation of my invention is that with a noise component added at frequencies at which there is zero power, the exact inverse of the power spectrum does not become infinite at these frequencies. Adding a noise component at every frequency throughout the power spectrum of $\phi(\tau) \cdot M(\tau)$ assures that a zero value will not be inverted to produce an infinite component.

To generate the spike 18 for introduction into the characterizing function at 19 (FIGURE 1), any of several apparatus may be used. For example, if the processing of seismic signals is done in analog mode, a conventional impulse generator, comprised of a D-C potential, a capacitor, and a switch, may be used. If the processing illustrated by the flow diagram of FIGURE 1 is being done in digital mode, a spike function may be added to the truncated autocorrelation function $\phi(\tau) \cdot M(\tau)$ by the following step in the well-known digital computed Fortran language:

$$A(1) = A(1) + .01*A(1)$$

where

A(1) is the storage location in the digital computer of the center point ($\tau = 0$) of the truncated autocorrelation function $\phi(\tau) \cdot M(\tau)$.

DERIVE INVERSE FILTER. With white noise added to the truncated autocorrelation function $\phi(\tau) \cdot M(\tau)$, a desired inverse filter $F(t)$ may be derived at step 22. Preferably, inverse filter $F(t)$ is a stable approximation to the exact inverse of the inverse of the minimum phase distorded shot pulse $C(t)$. Preferably, the inverse filter $F(t)$ derived at step 22 is the finite memory filter with the least mean squared error compared to all other filters which can be implemented on a digital computer. Inverse filter $F(t)$ is given by:

$$F(t) \cong \frac{1}{C(t)} \quad (6)$$

Methods and apparatus for deriving inverse filters are available in the art. For one method of deriving the preferable inverse filter $F(t)$, refer to U.S. Patent No. 3,275,980, issued Sept. 27, 1966, entitled "Methods of Inverse Filtering Geophysical Data," for Manus R. Foster. The outputs of step 22 are the filter coefficients of the desired inverse filter $F(t)$. Typical filter coefficients for $F(t)$ are illustrated by the graph of FIGURE 5.

INVERSE FILTER THE DATA. Next, the filter coefficients of $F(t)$ derived in step 22 are used to adjust the amplitudes of the memory components of a time domain filter. Then, the time domain filter $F(t)$ is convolved in step 24 with the input seismic trace $I(t)$. Preferably, the inverse filtering step 24 is performed on a general purpose $F(t)$. Alternatively, the inverse filtering step 24 may be done with an analog time domain filter such as the one disclosed in U.S. Patent 3,076,176 to Philip L. Lawrence.

APPLY THE "D" FILTER. As the final step in the processing, the output from the inverse filtering step at 24 is convolved with the $D(t)$ or "D" filter at 26 to produce the desired signal $\hat{S}(t)$. The "D" filter, whose amplitude spectrum is illustrated in FIGURE 6, is used to restrict the band width of the output because the inverse filter coefficients derived at 22 do not provide a good estimate of the inverse of the distorted shot pulse $C(t)$, at the high and the low frequencies. The "D" filter also reinserts the effect of a desired shot pulse $D(t)$ into the seismic data so that the output is the desired signal $\hat{S}(t)$ which would have been produced by the desired shot pulse filtered by the reflectivity of the earth.

The mathematical expression for the filtering of I(t) with $F(t)$ and $D(t)$ to produce the desired signal $\hat{S}(t)$ is given by:

$$\hat{S}(t) = I(t)*F(t)*D(t) \quad (7)$$

Substituting the expression for $I(t)$ given by Equation 1, we have:

$$\hat{S}(t) = [B(t)*H(t)*R(t) + N(t) + U(t)]*F(t)*D(t)$$
$$= B(t)*H(t)*R(t)*F(t)*D(t)$$
$$+ [N(t) + U(t)]*F(t)*D(t) \quad (8)$$

Now, substituting the expression for $B(t)*H(t)$ from Equation 2, we have:

$$\hat{S}(t) = C(t)*R(t)*F(t)*D(t) + [N(t) + U(t)]$$
$$*F(t)*D(t) \quad (9)$$

Since $$F(t) \cong \frac{1}{C(t)}$$

from Equation 6, $$C(t)*F(t) \cong \delta(t),$$

a unit spike function. Therefore, if $N(t)$ and $U(t)$ are small, Equation 9 reduces to Equation 3 from above:

$$\hat{S}(t) \cong D(t)*R(t)$$

The distorted shot pulse $C(t)$ has now been replaced by the desired shot pulse $D(t)$ in the seismic trace $I(t)$.

*Alternative methods of introducing white noise*

The present invention should not be limited to the above-described method of introducing white noise into the characterizing function. For example, if processing of seismic data is being done in the frequency domain, white noise may be introduced by adding equal-amplitude noise components at every frequency in the power density spectrum of the characterizing function. In FIGURE 4, a small amplitude component may be added at every frequency in the power density spectrum including the Nyquist folding frequency 20.

In still other embodiments of the present invention, white noise may be added to field data even before deriving or separating out the characterizing function. In FIGURE 9, field data, recorded on a magnetic tape 30 carried on a rotating drum 32, may be reproduced into electrical signal $I(t)$ by magnetic read head 34. White noise from generator 36 may be combined with signal $I(t)$ in the adder circuit 38. The output 40 of the adder circuit may then go on to further processing at 42. The white noise generator 36 may be of several known types, such as a gas tube circuit without input excitation.

Now that the invention has been completely described and illustrated with reference to certain specific embodiments, those skilled in the art may imagine still further embodiments. It is intended to cover all such embodiments as fall within the scope of the appended claims.

The invention claimed is:

1. A method of suppressing undesired components in a recorded seismic signal to make in more useful in interpreting the subsurface characteristics of the earth, comprising the steps of:
   (a) inputting said recorded seismic signal into a computer,
   (b) generating a function within said computer which characterizes said undesired components,
   (c) introducing white noise into said generated function by means of said computer, thereby assuring the stability of the inverse of said function,
   (d) producing within said computer a digital filter from the output of step (c) which will convert said undesired component into a spike-like function, (e) filtering within said computer the inputted seismic signal with said digital filter to produce a filtered signal with said undesired components suppressed, and (f) storing said filtered signal.

2. In the processing of geophysical data wherein there is derived an electrical function which characterizes an undesired component of said data, said function having an unstable exact inverse, the improved method comprising:

(a) introducing white noise into said electrical function, (b) generating from said electrical function an inverse filter which will convert said undesired component into a spikelike function, and (c) filtering said geophysical data with said inverse filter to produce an output with said undesired component attentuated.

3. A method as in claim 2 wherein said white noise is introduced into said electrical function by introducing equal-amplitude noise components at every frequency in the power density spectrum of said electrical function.

4. In claim 2 wherein said electrical function is an autocorrelation function of said undesired component, the method of introducing said white noise into said autocorrelation function comprising:

adding a spike function at zero time to said autocorrelation function.

5. The method of claim 4 wherein said spike function has an amplitude which is small compared to the peak amplitude of said autocorrelation function.

6. The method of claim 4 wherein said spike function has an amplitude of between about 0.1 percent and 10 percent of the peak amplitude of said autocorrelation function.

7. The method of claim 4 wherein said spike function has an amplitude of about 1 percent of the peak amplitude of said autocorrelation function.

8. A method of processing geophysical data to attenate an undesired component of said data, comprising:

(a) selecting at least a portion of said geophysical data, (b) generating a rectangularly truncated autocorrelation function of said portion, said truncated autocorrelation function characterizing said undesired component but having an unstable exact inverse.

(c) introducing white noise into said rectangularly truncated autocorrelation function, said white noise taking the form of a spike function whose amplitude is between about 0.1 percent and 10 percent of the peak amplitude of said truncated autocorrelation function, (d) producing from said rectangularly truncated autocorrelation function a filter which is a stable approximation to the exact inverse of said undesired component, and (e) filtering said geophysical data with said filter to produce an output with said undesired component attenuated.

9. A process for suppressing the undesired components of a recorded seismic signal to make it more useful in interpreting the subsurface characteristics of the earth, comprising the steps of:

(a) reproducing said recorded seismic signal as electrical pulses in digital form, (b) generating electrical pulses in digital form representing the samples of a rectangularly truncated autocorrelation function of at least a portion of said reproduced seismic signal, said truncated autocorrelation function characterizing said undesired components, (c) generating electrical pulses in digital form representing the samples of said rectangularly truncated autocorrelation function with white noise added thereto, said white noise taking the form of a spike function added at the zero shift time of said truncated autocorrelation function, and (d) filtering said reproduced seismic signal with a filter which is a stable approximation to the exact inverse of said undesired components to produce an output signal with said undesired components suppressed.

References Cited

UNITED STATES PATENTS 3,252,093  5/1966  Lerner.
3,303,335  2/1967  Pryor _____ 340.15.5 X

OTHER REFERENCES

George et al.: Inverse Convolution Techniques to Improve—Geophysical Data, Proceedings of the IRE, v. 50, November, 1962, pp. 2313–2319.

RODNEY D. BENNETT, *Primary Examiner.*

C. E. WANDS, *Assistant Examiner.*

UNITED STATES PATENT OFFICE
CERTIFICATE OF CORRECTION

Patent No. 3,396,365                                              August 6, 1968

Clyde W. Kerns

It is certified that error appears in the above identified patent and that said Letters Patent are hereby corrected as shown below:

Column 3, line 58, "$\varphi(\tau).\ M(\tau)$" should read -- $\varphi(\tau) \cdot M(\tau)$ --. Column 4, line 46, "wave form" should read -- waveform --. Column 6, line 44, "components" should read -- component --. Column 7, line 31, "computed" should read -- computer --; line 43, cancel "of the inverse"; line 44, "distorded" should read -- distorted --; line 66, before "F(t)" insert -- digital computer programed with the filter coefficients of --. Column 8, line 65, "in", first occurrence, should read -- it --. Column 9, line 13, "(a))" should read -- (a) --; lines 41 and 42, "attenate" should read -- attenuate --; line 45, "(b))" should read -- (b) --. Column 10, line 10, "(e))" should read -- (e) --; line 31, "(d))" should read -- (d) --.

Signed and sealed this 30th day of December 1969.

(SEAL)
Attest:

EDWARD M. FLETCHER, JR.                      WILLIAM E. SCHUYLER, JR.
Attesting Officer                            Commissioner of Patents